Sept. 22, 1959 E. KITTL 2,905,906
OSCILLATOR FREQUENCY CONTROL
Filed April 4, 1957
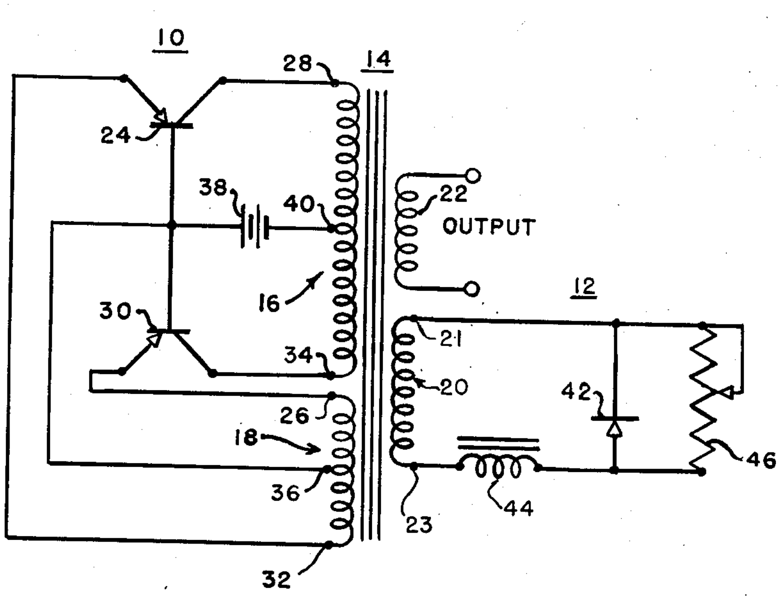
INVENTOR,
EMIL KITTL.
BY
Harry M. Saragovitz
ATTORNEY.

2,905,906

OSCILLATOR FREQUENCY CONTROL

Emil Kittl, Oceanport, N.J.

Application April 4, 1957, Serial No. 650,804

4 Claims. (Cl. 331—113)

(Granted under Title 35, U.S. Code (1952), sec. 266)

The invention described herein may be manufactured and used by or for the Government for governmental purposes, without the payment of any royalty thereon.

This invention relates to electrical oscillators and particularly to a means for magnetically controlling oscillator frequency response.

The prior art teaches the construction of oscillators in which the period of oscillation is dependent upon the saturation characteristic of magnetic core structures. One example of such an oscillator is the pushpull transistor square wave oscillator described in the copending application of Uchrin and Taylor entitled "Transistor Oscillator," Serial No. 554,597, filed December 21, 1955, now U.S. Patent 2,813,976. In this oscillator separate pushpull emitter and collector windings are magnetically coupled to produce oscillation, with the period of each half cycle of oscillation being equal to the time between core saturation in one direction and core saturation in the opposite direction.

While various methods of frequency control for oscillators having the foregoing characteristics have been devised, there has been generally lacking a simple frequency control requiring few components, and no external biasing or synchronizing potentials.

It is an object of the present invention to provide a frequency control means which is free of the objectional features mentioned and which is capable of operation over a substantial range.

In accordance with the invention an asymmetrical circuit is connected to the saturating core structure of the oscillator to decrease the flux change sharply at a point during one phase or half cycle of operation. This it has been found causes the oscillator to reverse phase before normal saturation is reached during that half cycle. It has also been found that the necessary rate and degree of the decrease in flux change may be obtained by connecting a uni-directional conductor or rectifier in series with a saturable reactor to an electrical winding which is magnetically coupled to the oscillator magnetic core structure. The rectifier is bridged with an electrical resistance, or by other means the reactor is biased in a sense opposite to what a forward current through the rectifier would apply. The reactor core saturation occurs during the half cycle when the rectifier is conducting to cause the previously noted premature oscillator phase reversal. The time of reactor saturation and thus the oscillator frequency is controlled by adjusting the degree of reverse flux bias, or reset flux, developed in the reactor during the preceding half cycle when the rectifier is not conducting. This may be readily and conveniently accomplished by adjusting the resistance value of a resistance connected across the rectifier.

The features of my invention which I believe to be novel are set forth with particularity in the appended claims. My invention itself, however, both as to its organization and method of operation, together with further objects and advantages thereof, may best be understood by reference to the following description taken in conjunction with the accompanying drawing which is a schematic circuit diagram of an embodiment of the invention.

In the drawing, there is shown a pushpull transistor oscillator 10 and oscillator frequency control 12. The oscillator includes a transformer 14, preferably having a core with a rectangular hysteresis characteristic, with a center-tapped collector winding 16, center-tapped emitter winding 18, frequency control winding 20, and output winding 22. The emitter of PNP transistor 24 is connected to terminal 32 of emitter winding 18, and the collector of transistor 24 is connected to terminal 28 of collector winding 16. Similarly, the emitter of PNP transistor 30 is connected to terminal 26 of emitter winding 18 and the collector of transistor 30 is connected to terminal 34 of collector winding 16. The emitter winding center tap 36 is connected to the base of both transistors and to the positive terminal of D.C. source 38. The center tap 40 of collector winding 16 is connected to the negative terminal of D.C. source 38.

The frequency control circuit consists of rectifier 42 in series with saturable reactor 44 with variable resistor 46 connected in parallel with the rectifier. This circuit is shown connected across transformer frequency control winding 20 although it may be connected across the output or collector winding as well. Saturable reactor 44 preferably should have a core with a rectangular hysteresis loop.

To consider the operation of the circuit shown in the drawing, first assume that due to inherent asymmetry in the pushpull oscillator 10 that a slight current commences flowing through the collector circuit of transistor 24. The collector and emitter windings 16 and 18 are wound to provide positive feedback between the collector and emitter circuits of each transistor so transistor 24 will turn on. There will then occur a rapid increase in current through collector winding 16, flowing from terminal 28 to terminal 40. We will assume that the resulting flux induces a voltage in frequency control winding 20 which is positive at terminal 21 with respect to terminal 23. With this polarity of voltage prevailing during the first half cycle of operation, rectifier 42, connected in series with winding 20 will not conduct and the current flow and flux level in reactor 44 will be substantially dependent upon the setting of variable resistor 46. The current in collector winding 16 will continue to increase until the transformer core saturates. At this point the voltages across all windings will commence dropping toward zero and there will occur a phase reversal to commence the second half cycle as transistor 24 turns off and transistor 30 turns on. Without the frequency control circuit the second half cycle would continue as did the first half cycle until the transformer core resaturates. Instead, since rectifier 42 will now conduct and effectively short out resistor 46, the core of reactor 44 will saturate first. When this occurs the resulting sharp increase in current through winding 20 causes the oscillator to reverse phase, thus cutting short the normal oscillation cycle. The degree that the cycle is decreased depends upon the prior flux level of the reactor which is set during the first half cycle and which may be controlled by adjustment of variable resistor 46. In this manner variable resistor 46 may function to vary the frequency of oscillator 10 over a wide range of adjustment, ranging from the normal frequency of the oscillator alone to in excess of fifty times the normal frequency. While variable resistor 46 is shown in its usual form, it may take the form of a vacuum tube, transistor or other variable resistance circuit. The circuit may be statically or dynamically controlled, i.e., by a voltage regulated D.C. signal or by an automatic frequency control derived signal. The reset bias on reactor 44 and thus the frequency of the oscillator may also be controlled by connecting a second winding on the reactor to which an adjustable control current is applied. In such case the bridging resistor 46 would be omitted. The control current, of course, may be either manually or automatically adjustable.

While there has been described what is at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In combination with an oscillator having a saturable magnetic core feedback coupling means and the frequency of which is determined by the period between the occurrence of opposite sense flux saturations of said means, frequency control means comprising an electrical winding magnetically coupled to said first named means, a saturable reactor and a rectifier in series across said winding, and means to supply a magnetic bias to said reactor of a sense opposite to that obtained by a forward current through said rectifier.

2. The combination of claim 1 wherein said oscillator is a pushpull transistor oscillator and said last mentioned means is a variable resistor connected across said rectifier.

3. In combination with an oscillator having a saturating core feedback coupling means and the frequency of which is determined by the period between the occurrence of opposite sense flux saturations in said means, asymmetrical means connected to said first named means for decreasing said period, said asymmetrical means comprising means to sharply decrease the flux change in said first named means in one sense prior to core saturation in that sense, and said decrease in flux change being of such rate as to produce a phase reversal of said oscillator output; wherein said asymmetrical means comprises an electrical winding associated with said first named means, a series circuit comprising a unidirectional conductor and a saturable reactor being connected across said winding, means for biasing said reactor in a sense opposite to that produced by a forward current through said series circuit, and said reactor being adapted to saturate to produce said decrease in flux change in said first named means only when said unidirectional conductor is conducting.

4. The combination set forth in claim 3, wherein said oscillator is a pushpull transistor oscillator and said first named means is a saturable core transformer.

References Cited in the file of this patent

UNITED STATES PATENTS

| | | |
|---|---|---|
| 2,424,236 | Huge | July 22, 1947 |
| 2,783,384 | Bright et al. | Feb. 26, 1957 |
| 2,801,341 | Jaffe et al. | July 30, 1957 |
| 2,826,731 | Paynter | Mar. 11, 1958 |
| 2,852,730 | Magnuski | Sept. 16, 1958 |

OTHER REFERENCES

Article, "Magnetic Amplifiers for Synchronous Motors," by Zucchino, pages 133–135 of "Electronics," for March 1954.